(12) United States Patent
Smith

(10) Patent No.: US 6,384,995 B1
(45) Date of Patent: May 7, 2002

(54) APPARATUS AND METHOD FOR DETECTING DEFECTS IN DATA STORAGE DEVICES

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1641 days.

(21) Appl. No.: 08/614,324

(22) Filed: Mar. 12, 1996

Related U.S. Application Data

(63) Continuation of application No. 08/351,574, filed on Dec. 7, 1994, now abandoned, which is a continuation of application No. 08/226,446, filed on Apr. 12, 1994, now abandoned, which is a continuation of application No. 07/996,296, filed on Dec. 23, 1992, now abandoned.

(51) Int. Cl.[7] .................................................. G11B 5/02
(52) U.S. Cl. .......................................... 360/31; 360/25
(58) Field of Search ............................. 360/31, 75, 26, 360/137, 25, 6; 364/551.01; 369/44.32; 702/123

(56) References Cited

U.S. PATENT DOCUMENTS

| | | | | |
|---|---|---|---|---|
| 4,638,425 A | | 1/1987 | Hartung ....................... | 364/200 |
| 4,777,544 A | | 10/1988 | Brown et al. .................. | 360/75 |
| 4,942,609 A | * | 7/1990 | Meyer ........................ | 360/31 X |
| 4,972,316 A | | 11/1990 | Dixon et al. ................. | 364/200 |
| 5,130,936 A | * | 7/1992 | Sheppard et al. ...... | 364/551.01 |
| 5,168,413 A | * | 12/1992 | Coker et al. .................. | 360/75 |

OTHER PUBLICATIONS

IBM Technical Disclosure Bulletin, vol. 32, No. 9A, Feb. 1990, PP 280–283, "Glide Test Technique" by J. W. Annis and G. J. Smith.

Research Disclosure, Feb. 1991, No. 322, Kenneth Mason Publications Ltd, England, "In–Situ Head–Asperity Contact Detection".

\* cited by examiner

*Primary Examiner*—Andrew L. Sniezek
*Assistant Examiner*—Mitchell Slavitt
(74) *Attorney, Agent, or Firm*—Roy W. Truelson; Joan Pennington

(57) ABSTRACT

A disk drive is tested during the manufacturing process, after the head/disk assembly is completely assembled and enclosed in its protective enclosure. A known data pattern is written to selected tracks on the disk surface, and the data is read back. During the read process, the analog read signal is sampled at first and third harmonic rates, and the logarithmic ratio of the two sampled signals used to derive a harmonic ratio flyheight (HRF) signal approximating the flyheight of the head. When a transducer head passes over a surface asperity, a collision occurs, causing the transducer to be lifted momentarily above its normal flyheight. If the amplitude of the HRF signal exceeds a predetermined clipping level, a possible disk defect is indicated. In order to characterize the possible defect, a window of the HRF signal samples in the vicinity of the suspected abnormality is digitized and used as the input to a neural network. The neural network is trained with actual HRF samples from previously detected disk drive abnormalities, which have been categorized by microscopic examination or other means. The neural network produces an output for the HRF signal samples from the drive being tested which indicates whether the defect is of a type which can be ignored, or of a type which requires scrapping or rework of the drive.

7 Claims, 11 Drawing Sheets

|  | HIDDEN 1 | HIDDEN 2 | HIDDEN 3 | HIDDEN 4 |
| --- | --- | --- | --- | --- |
| INPUT 1 | -2.833230 | -1.552301 | -0.326641 | -0.455589 |
| INPUT 2 | 4.768289 | 1.227474 | -0.404802 | -0.106341 |
| INPUT 3 | -3.982567 | -4.335752 | -0.838601 | -2.611671 |
| INPUT 4 | -3.072192 | -4.219085 | -0.783488 | -0.156652 |
| INPUT 5 | 0.927397 | -4.842560 | -0.925335 | -0.826204 |
| INPUT 6 | 4.893694 | 3.481157 | -1.103044 | -2.276217 |
| INPUT 7 | 2.394119 | 4.328611 | -0.618670 | -2.581157 |
| INPUT 8 | -4.332343 | 3.368421 | -0.348689 | -0.246130 |
| INPUT 9 | -6.246346 | 2.408527 | 0.066454 | -0.156453 |
| INPUT 10 | 0.093531 | 1.371380 | -0.253647 | -0.995944 |
| INPUT 11 | -7.660387 | 0.515946 | -0.472687 | -0.821063 |
| INPUT 12 | -0.985906 | 1.394557 | -0.036528 | -0.962610 |
| INPUT 13 | -3.228939 | 2.479501 | -0.293819 | -1.292179 |
| INPUT 14 | -0.220159 | 1.309922 | -0.775009 | -1.095828 |
| INPUT 15 | -1.882253 | -0.517373 | 0.085512 | -0.708064 |
| INPUT 16 | -5.301219 | -1.593254 | 0.445156 | 0.771954 |

|  | OUTPUT 1 | OUTPUT 2 |
| --- | --- | --- |
| HIDDEN 1 | 5.746662 | -5.726366 |
| HIDDEN 2 | 6.055262 | -6.080668 |
| HIDDEN 3 | -0.148412 | 0.560722 |
| HIDDEN 4 | -2.417480 | 2.696442 |
| HIDDEN 5 | -2.640955 | 2.425654 |
| HIDDEN 6 | -3.037059 | 2.998347 |
| HIDDEN 7 | -3.575006 | 3.351243 |
| HIDDEN 8 | -1.125469 | 1.358497 |

FIG. 7A

|  | HIDDEN 5 | HIDDEN 6 | HIDDEN 7 | HIDDEN 8 |
|---|---|---|---|---|
| INPUT 1 | 0.238237 | 0.128550 | 0.287571 | -0.304705 |
| INPUT 2 | -0.550722 | -1.413665 | -1.388643 | -0.337970 |
| INPUT 3 | -2.756306 | -2.685272 | -3.461704 | -1.667455 |
| INPUT 4 | -0.318415 | -0.406412 | -0.115445 | -0.562445 |
| INPUT 5 | -0.895039 | 0.052914 | 0.513574 | -0.482271 |
| INPUT 6 | -2.339128 | -2.811660 | -2.825845 | -1.433532 |
| INPUT 7 | -2.268259 | -3.354414 | -4.269684 | -1.773573 |
| INPUT 8 | -0.507351 | -0.345355 | -0.443898 | -0.524990 |
| INPUT 9 | -0.579257 | 0.133745 | 0.313202 | -0.695772 |
| INPUT 10 | -0.634106 | -1.280295 | -1.845118 | -0.819042 |
| INPUT 11 | -1.271884 | -0.783188 | -0.260488 | -0.371526 |
| INPUT 12 | -0.439090 | -0.949524 | -1.391422 | -0.313546 |
| INPUT 13 | -1.403885 | -1.259923 | -1.074776 | -0.728336 |
| INPUT 14 | -1.534005 | -1.859699 | -1.866968 | -0.594304 |
| INPUT 15 | -0.357100 | -1.163525 | -1.132141 | -0.318768 |
| INPUT 16 | 0.693553 | 0.343547 | 1.171244 | 0.585020 |

FIG. 7B

APPARATUS AND METHOD FOR DETECTING DEFECTS IN DATA STORAGE DEVICES

This application is a continuation of application Ser. No. 08/351,574, filed Dec. 7, 1994, now abandoned, which is a continuation of application Ser. No. 08/226,446, filed Apr. 12, 1994, now abandoned which was a continuation of application Ser. No. 07/996,296, filed Dec. 23, 1992 now abandoned.

FIELD OF THE INVENTION

The present invention relates to data storage devices, and in particular to an enhanced method and apparatus for detecting defects in a data storage device.

BACKGROUND OF THE INVENTION

Modern computer systems process and store ever increasing volumes of data. Data is commonly stored on rotating magnetic disk drives. A rotating magnetic disk drive typically contains one or more disks rigidly attached to a spindle which is driven at a constant rotational velocity. Data is magnetically encoded on concentric tracks on the surfaces of the disks. In order to read or write data, one or more transducer heads, each attached to a movable actuator arm, are positioned over respective concentric tracks of data. Electrical circuits in the drive read signals generated from the transducer as the moving disk passes along it, or write data to the disk surface by energizing the transducer as the disk moves.

The rotating magnetic disk drive is a complex electro-mechanical assembly, requiring a high degree of sophisticated technology in its design and manufacture. In order to store data at the high densities demanded by the marketplace, all moving parts must be fabricated to exacting tolerances. This is particularly true of the disk surface itself. In addition, even where all component parts are produced within tolerances, minor errors or variations in any number of assembly tasks can introduce defects in the finished disk drive product.

Although great care may be taken during all stages of disk drive manufacture to assure quality, it is inevitable that, due to the inherent complexity and close tolerances of the device, a proportion of the finished disk drive assemblies will not function as they should. To avoid shipping defective disk drives to a customer, it is necessary to inspect and test each individual disk drive assembly.

One source of potential defects is in the disk surface itself. Proper disk operation requires that the transducer head maintain a very close proximity to the surface of the disk as the disk rotates. This distance between transducer head and disk surface is known as the "flyheight". At the same time, physical contact between the transducer head and the disk surface is to be avoided, because it can damage the head. As data storage densities have increased and the size of the transducer has correspondingly been reduced, it has become necessary to reduce the desired flyheight of the head. This in turn requires that the disk surface be extremely even. A microscopic outcropping in the disk surface or particle resting on the disk surface may collide with the head, causing device failure.

If a disk surface irregularity is sufficiently large, a single collision or a small number of collisions produced during testing may cause the head to fail, and thus be detected by conventional means. In most cases, however, the surface irregularity must collide with the head many times before the head is damaged. A disk drive with such a surface irregularity may easily pass a functional test, yet fail when exposed to repeated head collisions in actual use.

In order to verify the uniformity of the disk surface, it has been known to test the disk and spindle assembly by mounting the disk and spindle assembly in a special test bed and inserting a specially constructed head/actuator test assembly from the test bed in the disk. This head/actuator test assembly contains small piezoelectric sensors which can sense sudden acceleration of a head produced by a collision. There are several problems with this approach to testing the disk surface. The test introduces additional handling because each disk and spindle assembly must be physically secured to a test bed apparatus, and the special heads inserted into the disk and spindle assembly. The test bed apparatus itself is expensive. Both the test bed apparatus and the disk drives under test are very delicate and subject to damage. Finally, the nature of the test demands that the disk drive protective enclosure be installed after the test, and thus it is possible for contaminant particles to settle on the surface of the disk or other defects to be introduced after it has passed the test and before the protective enclosure is installed.

An alternative method of testing is to place piezoelectric sensors on the head/actuator assemblies of the disk drive that are ultimately shipped to customers. With this alternative, it is possible to test the disk drive after the protective enclosure is installed, thus avoiding some of the handling problems associated with a special test bed. However, this alternative requires piezoelectric sensors in the finished product, considerably increasing the cost of the product.

IBM Technical Disclosure Bulletin, Vol. 32, No. 9A, p. 280 (February 1990) discloses another alternative testing method. In this method, a harmonic ratio flyheight (HRF) signal is derived from the data read signal produced by the transducer. This alternative presents advantages over the use of piezoelectric sensors, in that defects can be detected using the actual transducer hardware in place, without the insertion of a test head/actuator or the addition or piezoelectric sensors to the finished product. However, the HRF signal is a less accurate indicator of defects, and is in particular susceptible of giving "false positives".

SUMMARY OF THE INVENTION

It is, therefore, an object of the present invention to provide an enhanced data storage device.

Another object of this invention is to provide an enhanced method and apparatus for manufacturing data storage devices.

Another object of this invention is to provide an enhanced method and apparatus for detecting defects in a data storage device.

Another object of this invention is to increase the accuracy of detecting defects in a data storage device.

Another object of this invention is to reduce the frequency of undetected defects in a data storage device.

Another object of this invention is to reduce the frequency of rejecting data storage devices during inspection and testing, when the device is in fact not defective.

Another object of this invention is to increase the reliability of data storage devices.

Another object of this invention is to reduce the cost of manufacturing and testing data storage devices.

In a preferred embodiment, a disk drive assembly is tested during the manufacturing process. Testing is performed after the mechanical disk assembly, comprising the spindle, motor, disks, actuator, and transducer heads, is completely assembled and enclosed in its protective enclosure. A known data pattern is written to selected tracks on the disk surface, and the data is read back. During the read process, the analog read signal is sampled at first and third harmonic rates, and the logarithmic ratio of the two sampled signals used to derive a harmonic ratio flyheight (HRF) signal. In the absence of certain abnormalities, the HRF signal approximates the distance between the surface of the disk and the transducer head (flyheight).

When a transducer head passes over an outcropping or particle on the disk surface of sufficient size, a collision occurs, causing the transducer to be lifted momentarily above its normal flyheight. Thus, when the amplitude of the HRF signal exceeds a predetermined clipping level, a possible disk defect is indicated.

Not all abnormalities which may cause the HRF signal to exceed the clipping level are in fact caused by outcroppings or contamination. Certain abnormalities, such as magnetic voids, may have no effect on long term reliability of the disk drive assembly and can either be ignored or circumvented through conventional disk formatting techniques. Different types of abnormalities exhibit different HRF signal profiles.

In order to characterize the possible defect, a window of the HRF signal samples in the vicinity of the suspected abnormality is digitized and used as the input to a neural network. The neural network is trained with actual HRF samples from previously detected disk drive abnormalities, which have been categorized by microscopic examination or other means. Thus, the neural network will recognize and distinguish different types of abnormalities. The neural network produces an output for the HRF signal samples from the drive being tested which indicates whether the defect is of a type which can be ignored, or of a type which requires scrapping or rework of the drive.

In a preferred embodiment, the neural network is an artificial neural network executing on a suitably programmed general purpose computer.

BRIEF DESCRIPTION OF THE DRAWINGS

FIG. 7 is a table of neural network weighting factors used in the neural network of the preferred embodiment;

DETAILED DESCRIPTION OF THE PREFERRED EMBODIMENT

Figure 1:
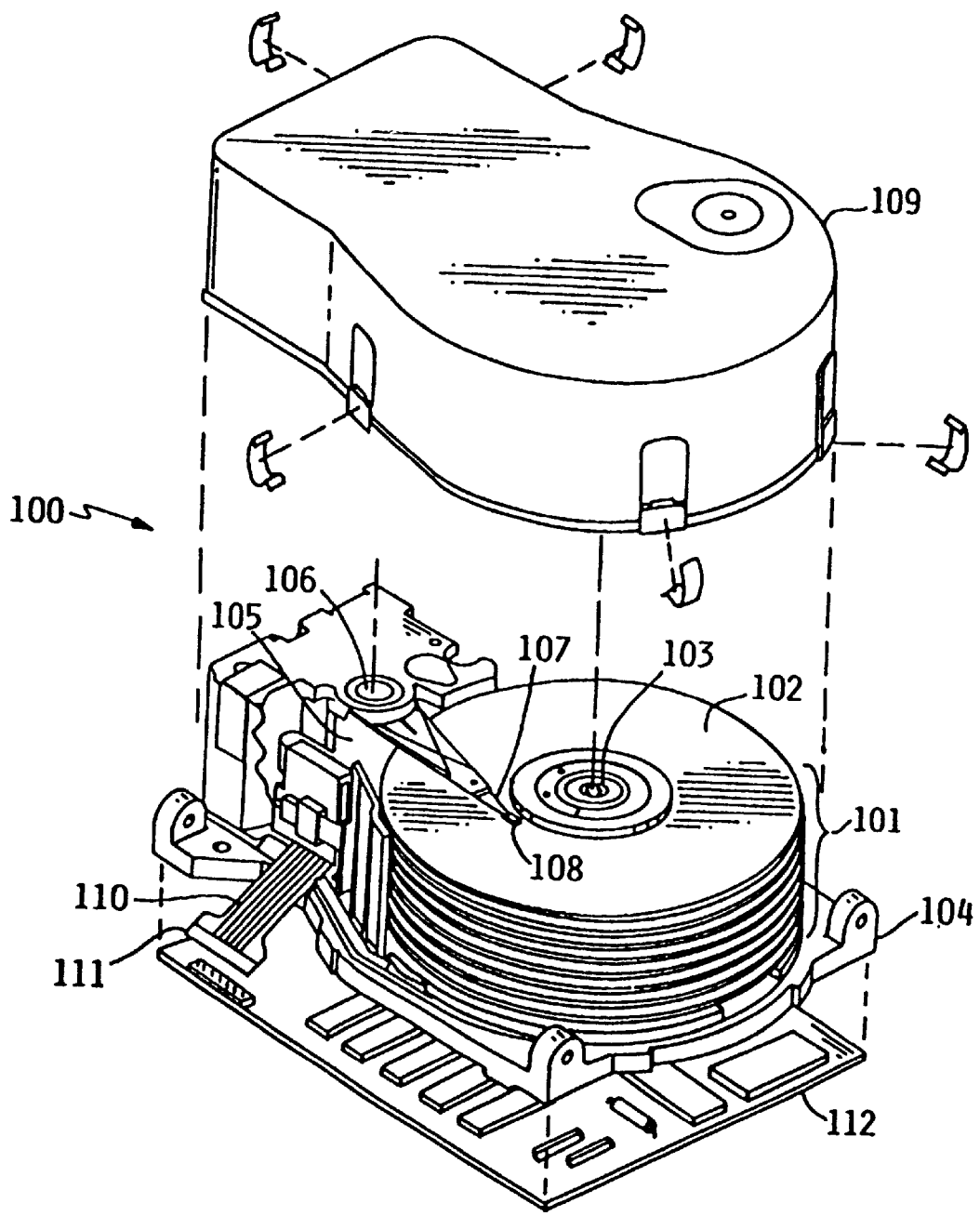
FIG. 1 is a view of a typical disk drive assembly with protective enclosure and control electronics shown in exploded form, suitable for use in conjunction with the present invention.

FIG. 1 shows a typical disk drive assembly 100. A plurality of disks 101 having magnetic recording surfaces 102 are rigidly attached to common hub or spindle 103, which is mounted on base 104. Spindle 103 and disks 101 are driven by a drive motor (not visible) at a constant rotational velocity. Comb-like actuator assembly 105 is situated to one side of disks 101. Actuator 105 rotates through an arc about shaft 106 parallel to the axis of the spindle, driven by an electromagnet, to position the transducer heads. A plurality of head/suspension assemblies 107 are rigidly attached to the prongs of actuator 105, one head/suspension assembly 107 corresponding to each disk recording surface 102. Typically, data is recorded on both surfaces of the disk, making two opposed head/suspension assemblies for each disk. An aerodynamic transducer head 108 is located at the end of each head/suspension assembly 107 adjacent the disk surface. Head/suspension assembly 107 is essentially a beam spring tending to force transducer head 108 against the surface of the disk 102. The aerodynamic characteristics of the head counteract the force of the beam spring, making the head "fly" a small distance from the surface of the disk due to air movement caused by the spinning disk.

Typically, the critical moving parts of the disk drive assembly, such as the disks, spindle, and actuator with attached head/suspension assemblies, are assembled to base 104 in a filtered air environment to prevent airborne contamination from settling on the disk surface. Protective enclosure 109 is fitted over these moving parts and mates with base 104, substantially sealing the moving parts. In the preferred embodiment, a plurality of wires 110 which carry electrical signals to the transducer heads and the actuator electromagnet exit enclosure 109 and terminate in an electrical coupling 111. This coupling connects to circuit card 112 containing electronic components necessary to the disk drive function, which is located outside the protective enclosure and attached to the assembly after the protective enclosure is in place.

Figure 2:
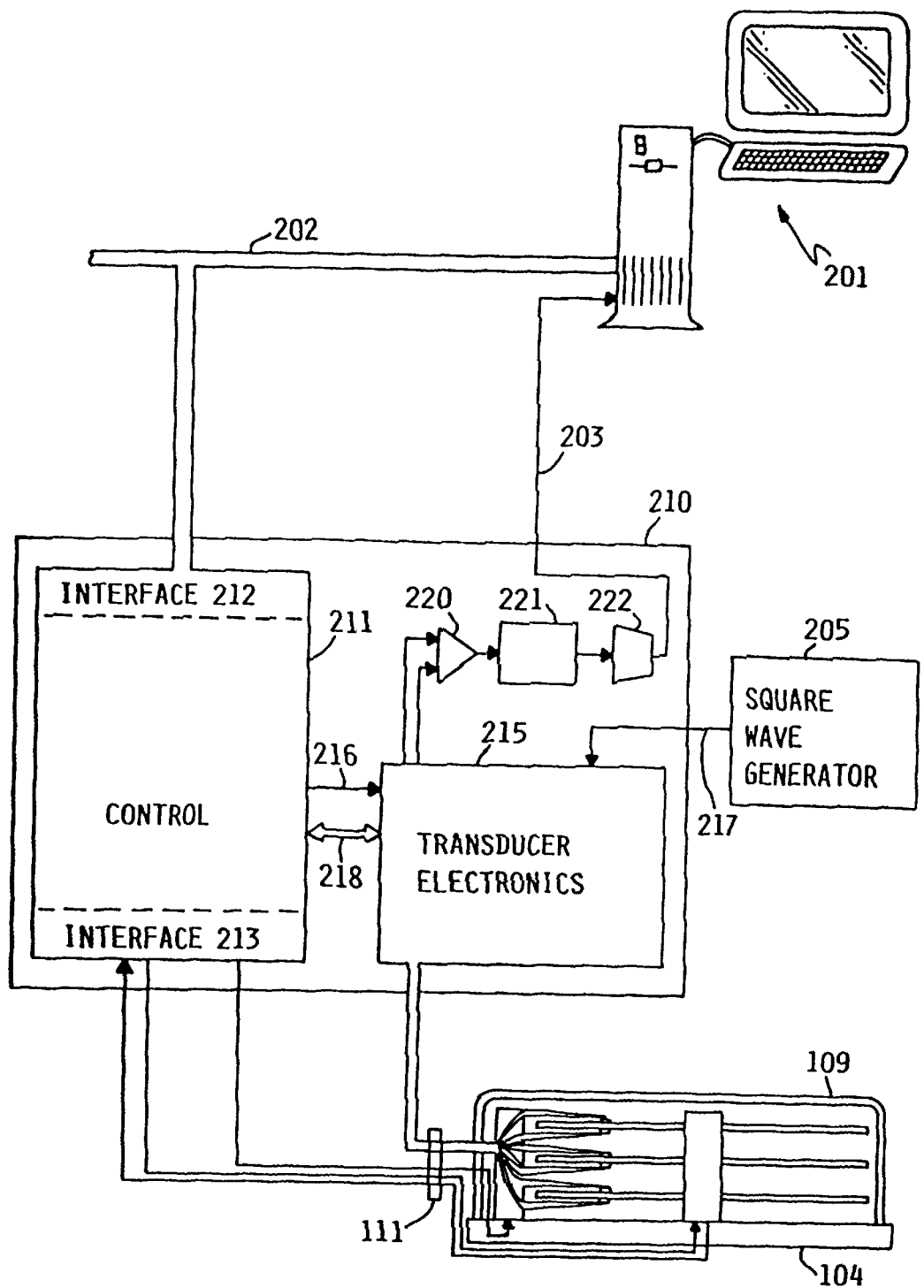
FIG. 2 shows the major components of a typical manufacturing test station according to the preferred embodiment of the present invention.

In accordance with the preferred embodiment, a disk drive assembly is tested as part of the manufacturing process. FIG. 2 shows the major components of a typical manufacturing test station according to the preferred embodiment. The major components of the test station are a general purpose computer used as a test monitor 201, a "gold card" 210 containing electronics for exercising the disk drive under test, and a square wave generator 205 for supplying a test signal.

In this embodiment, testing is performed after protective enclosure 109 of the disk drive under test is in place. Once the protective enclosure is in place, the critical moving parts are less subject to damage or contamination, and the likelihood that a defect would be introduced after testing is accordingly reduced. However, the circuit card containing drive electronics is not yet assembled to the disk drive under test.

The test station of FIG. 2 tests the components within the enclosure, and not the drive electronics on circuit card 112 (shown in FIG. 1). The test station contains its own special circuit card, known as a "gold card". This card is plugged into the disk drive assembly at coupling 111 as shown, this being the same coupling that is normally used for circuit card 112 that is shipped with the drive. The "gold card" contains the same drive electronics contained in standard circuit card 112, but also contains additional electronics which are used for testing the disk drive mechanical assembly, also known as the head/disk assembly. In the preferred embodiment, these tests are performed only as part of the manufacturing process. Therefore, it would be uneconomical to include electronics required for such tests in standard circuit card 112 shipped to customers with the disk drive, and accordingly the special "gold cards" are used for testing.

The "gold cards" are coupled to a general purpose computer which is used as a test monitor. The test monitor communicates with the gold cards via bus 202 operating on the Small Computer Systems Interface (SCSI) protocol. The computer issues commands to read and write data to the gold cards, which in turn attempt to perform the function on the drives under test. Each test monitor is capable of simultaneously testing multiple disk drives by issuing commands to multiple gold cards via SCSI bus 202, although in FIG. 2 only one gold card 210 and disk drive is shown.

The test station is capable of performing various tests on the partially completed disk drive assembly. In particular, it performs an asperity test of the disk surface to verify that the surface is sufficiently uniform and is not likely to fail after shipment to the customer. In order to test the partially completed disk drive assembly, the test monitor commands the gold card to write an alternating pattern from square wave generator 205 to various tracks on the disk surfaces, and then attempts to read back the data written. Special electronics in the gold card are used to derive a harmonic ratio flyheight (HRF) signal during readback. This signal is then analyzed by the test monitor to determine whether defects exist.

Gold card 210 comprises a control electronics portion 211 and a transducer electronics portion 215. Control electronics portion 211 manages communications with the test monitor 201 via SCSI bus 202, and controls the operation of the spindle drive motor and actuator mechanism. Control electronics comprises a suitably programmed microprocessor, a memory for storage of a control program, interface electronics 212 for interfacing with the SCSI bus, and interface electronics 213 for interfacing with the disk drive. Interface electronics 213 contains drivers and commutation electronics required to drive spindle drive motor, and drivers for the actuator electromagnet. Transducer electronics portion 215 comprises drive and sense electronics for the transducer heads in the disk drive, and switching electronics for selecting an appropriate disk transducer head in response to a head select signal from control electronics 211. Control electronics communicates data and control signals to transducer electronics via various data and control lines shown collectively as 218. These functions are also contained in the circuit card that is shipped with the finished disk drive, and are known in the art.

The gold card contains several modifications and additions to the standard circuit card required to support testing in accordance with the present invention. Control electronics portion 211 is programmed to recognize a special command from monitor 201, directing the card to accept a write signal from an external source. Upon receipt of such a command, control electronics portion 211 activates write gate control line 216, which forces transducer electronics 215 to accept the external write signal from external write line 217. Additionally, a tap of the readback signal lines is fed into differential amplifier 220, and the result input to HRF signal generator 221 and high-pass filter 222 to produce an analog output on line 203 which represents the harmonic ratio flyheight signal.

The HRF signal is a logarithmic ratio of the amplitudes of the first harmonic of the read signal (i.e., the frequency of the original write data pattern) and the third harmonic of this signal. HRF signal generator 221 comprises electronics for amplitude modulation and comparison of the two harmonics to produce this ratio. It has been demonstrated that the amplitude of the raw read back signal is proportional to the exponential of $-2\pi d/L$, where d is the flyheight and L is the wavelength of the head, i.e. the distance travelled by the head with respect to the data surface in one cycle at the selected harmonic frequency. However, this signal amplitude is also affected by many other terms unrelated to d. By taking the log ratio of the raw read back signal at two different significant frequencies, these multiplicative effects cancel out and the resultant HRF signal is directly proportional to d, the flyheight. High-pass filter 222 is used to filter noise near the frequency of rotation of the disk drive. Derivation of the HRF signal is described in greater detail in U.S. Pat. No. 4,777,544 to Brown, et al., issued Oct. 11, 1988, incorporated herein by reference.

Figure 3:
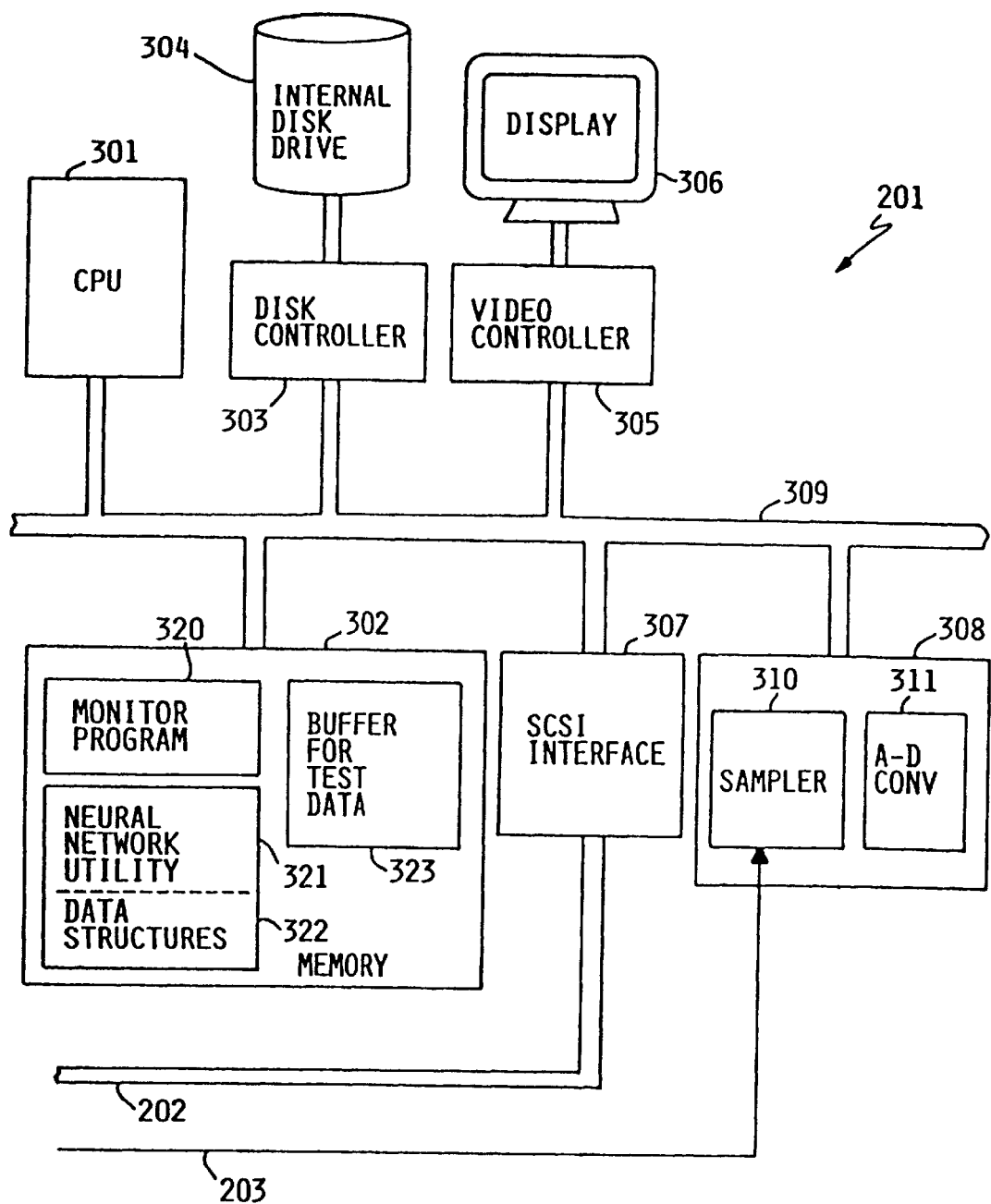
FIG. 3 shows in greater detail the major components of the test monitor portion of the manufacturing test station shown in FIG. 2, according to the preferred embodiment of the present invention.

FIG. 3 shows the major components of test monitor 201. In the preferred embodiment, test monitor 201 is an IBM PS/2 computer system, suitably programmed and modified with appropriate hardware for communicating on the SCSI bus. However, it should be understood that any general purpose computer system could be used, or that the present invention could be practiced with a special purpose test monitor. Test monitor 201 comprises CPU 301, random access memory 302, disk storage adapter 303 coupled to internal disk storage 304, video controller 305 coupled to video display 306, SCSI bus interface attachment 307, and converter card 308, all of which communicate with each other over system bus 309 as shown.

Converter card 308 is coupled to analog output line 203 of gold card 210 to receive the analog output representing the amplitude of the readback signal. Converter card comprises sampler 310 and analog-to-digital converter 311. The analog signal on line 203 is sampled by sampler 310 at a predetermined sampling rate, and converted to a digital representation of the magnitude of the signal by analog-to-digital converter 311. The sampled and digitized representations of the readback signal are communicated over bus 307 and stored in buffer 323 of memory 302 for analysis. In the preferred embodiment, converter card 308 is an add-on card for the IBM PS/2 computer known as an analog-to-digital acquisition card, available from Burr Brown Company; however, other commercially available cards are available from other sources to provide this function.

Memory 302 contains monitoring program 320, neural network utility 321, neural network data structures 322, and sample buffer 323. Monitoring program 320 is an applications program for execution on CPU 301 which oversees the operation of the asperity test as described more fully below. Neural network utility 321 and data structures 322 together form an artificial neural network for execution on CPU 301 which are used to analyze and characterize digitized signal samples returned from a test. Sample buffer 323 is used for storage of digitized signal samples generated by converter card 308. While memory 302 is shown in FIG. 3 as a containing all programs and data, it should be understood that some programs and data may be stored in internal disk drive 304 and loaded into memory 302 on an as needed basis. It should also be understood that memory 302 is not necessarily a monolithic entity, and may comprise high speed cache portions as well as slower speed memory chips.

Neural network utility 321 is a program for execution on CPU 301 which simulates a neural network. Neural network data structures 322 define the type of network to be simulated, the topology of the nodes, the adaptive weights to be assigned to the data paths, and other parameters. In the preferred embodiment, utility 321 is the IBM Neural Network Utility and data structures 322 are those data structures defined and used by the IBM Neural Network Utility, The operation of the IBM Neural Network Utility and its associated data structures is described in U.S. Pat. No. 5,142,665 to Bigus, issued Aug. 25, 1992, in commonly assigned U.S. patent application Ser. No. 07/687,582, filed Apr. 18, 1991, entitled "Enhanced Neural Network Shell for Application Programs", and in commonly assigned U.S. Patent application Ser. No. 07/687,364, filed Apr. 18, 1991, entitled "Apparatus and Method for Facilitating Use of a Neural Network", all of which are incorporated herein by reference.

The IBM Neural Network Utility used in the preferred embodiment supports simulation of several different types of neural networks on a single processor. A neural network type is selected by the user and a data structure representing the type and topology of the network is created and stored. For example, the number of inputs, number of outputs, data types of input and output, number of hidden nodes, connections between nodes, etc. are defined. Additionally, a data conversion template may define a data type conversion for data entering and leaving the network. This data structure is shown in FIG. 3 as element 322.

A neural network is conceptually a directed graph of nodes and connections, each connection running between two nodes in a single direction, from a source node to a target node. An adaptive weight is associated with each connection. The adaptive weight is a coefficient which is applied to the value of the source node to produce a portion of the value of the target node, The value of the target node is the summation of the products of the adaptive weights of each connection into the target node times the value of the source node of the respective connection, i.e.:

$$\text{Target\_Value} = \Sigma \text{Source\_Value}(i) \times \text{Weight}(i)$$

Figure 4:
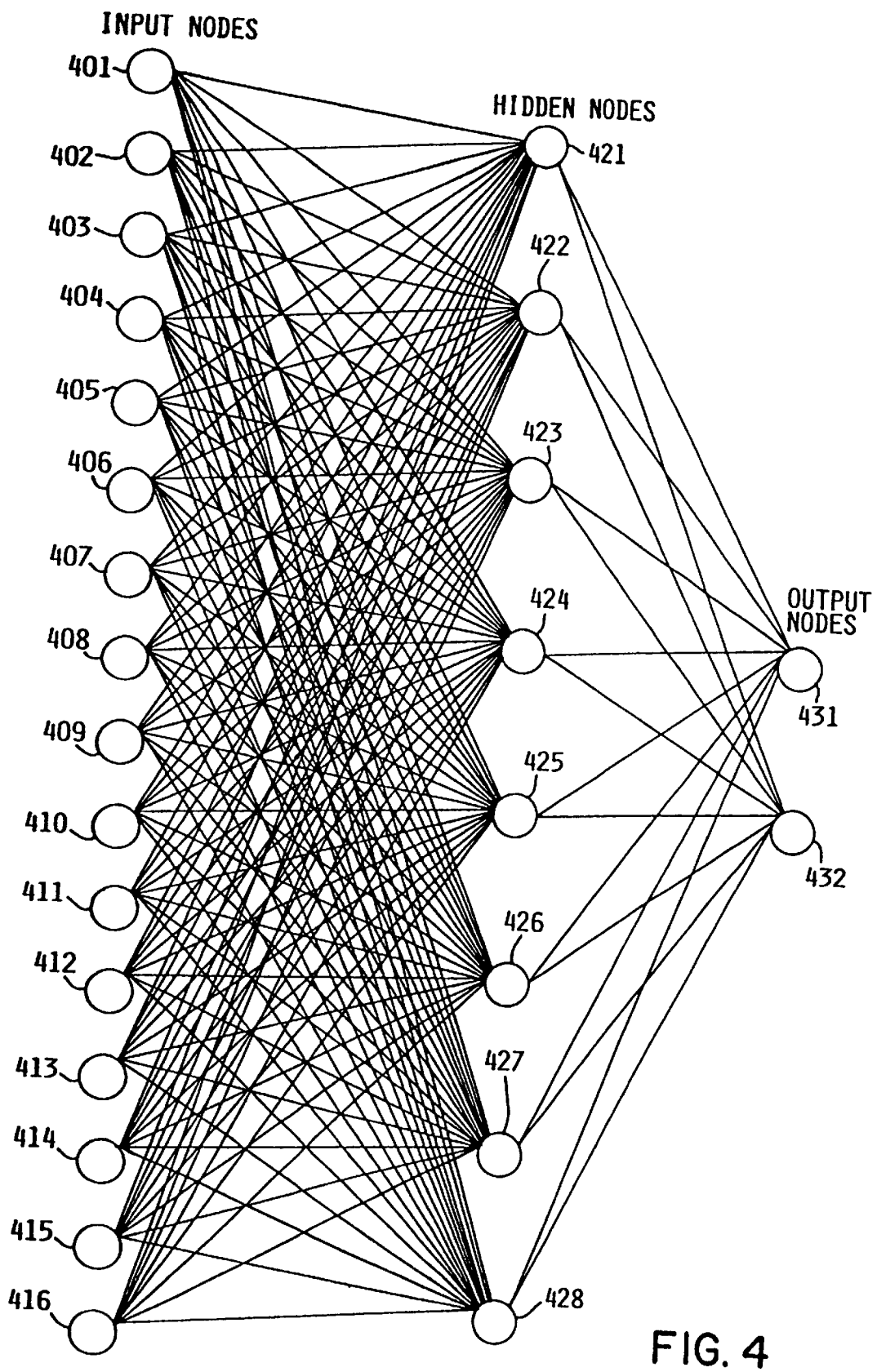
FIG. 4 is a conceptual diagram of the neural network used to analyze test data according to the preferred embodiment.

FIG. 4 is a conceptual diagram of the neural network of the preferred embodiment. In this embodiment, the neural network is of the "back propagation" type, as is known in the neural network art. The network comprises 16 input nodes 401–416 at the first level, 8 hidden nodes 421–428 at the second level, and 2 output nodes 431–432 at the third level. In the neural network of the preferred embodiment, each of the 16 input nodes receives a single value of the sampled digitized HRF taken at a particular time. Each of the two output nodes corresponds to one of the two possible conclusions to be drawn from the data, either that a surface asperity exists or that some other defect exists. The network is fully connected; i.e., a connection exists from each node at a first level to each node at the next succeeding level. It should be understood that FIG. 4 represents the neural network of the preferred embodiment in a conceptual sense only. In physical reality, this network is simulated by neural network utility 321 executing on CPU 301 in accordance with data structures 322. However, the network could be constructed as physical hardware processors and data links.

After a user creates the basic framework of the neural network, the utility trains the network by analyzing training data. Training data comprises a sufficiently large number of examples of inputs and desired output. During the training process, the utility constantly updates the values of the adaptive weights associated with nodal connections to achieve conformance to the desired training data output from the input as nearly as possible.

In the preferred embodiment, training data is generated by taking actual disk drives which produced irregular test results and analyzing the disk drives to determine the true cause of the irregular results. Since the neural network can not be used for generating the training data, this analysis must be performed by means independent of the neural network. In the case of disk surface asperities, this typically means visual or microscopic examination of the disk surface to determine whether a surface asperity actually exits.

Figure 5A:
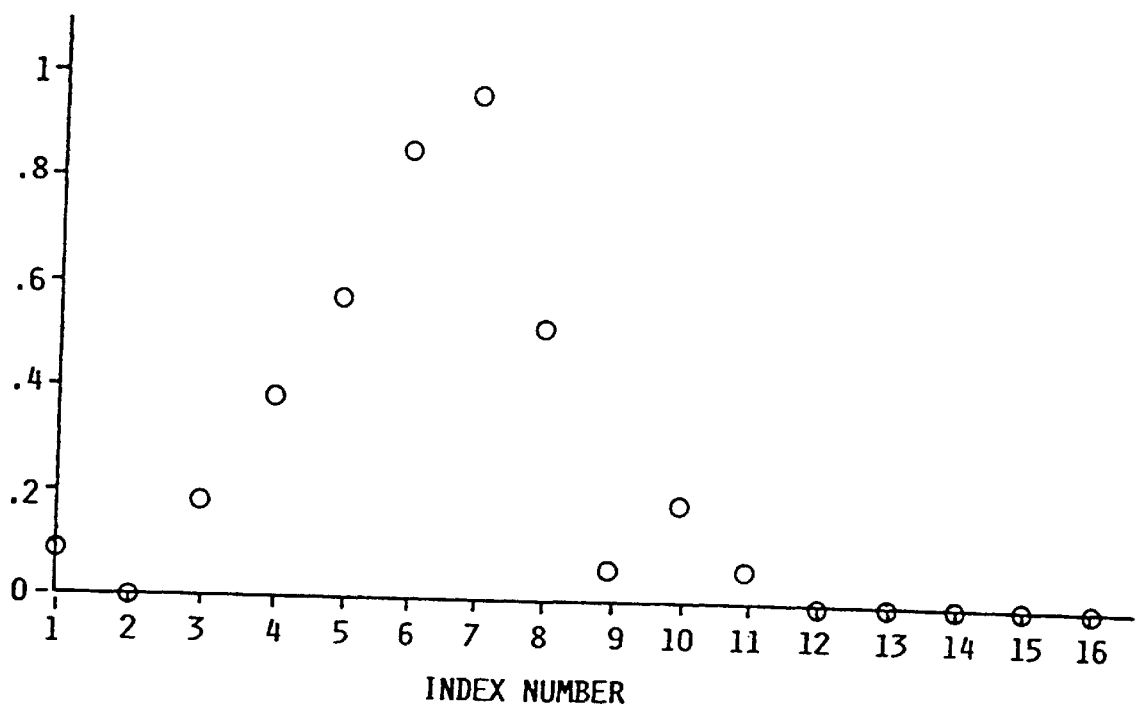
FIGS. 5A and 5B show two examples of HRF signal data caused by surface asperities and used to train the neural network of the preferred embodiment.
Figure 5B:
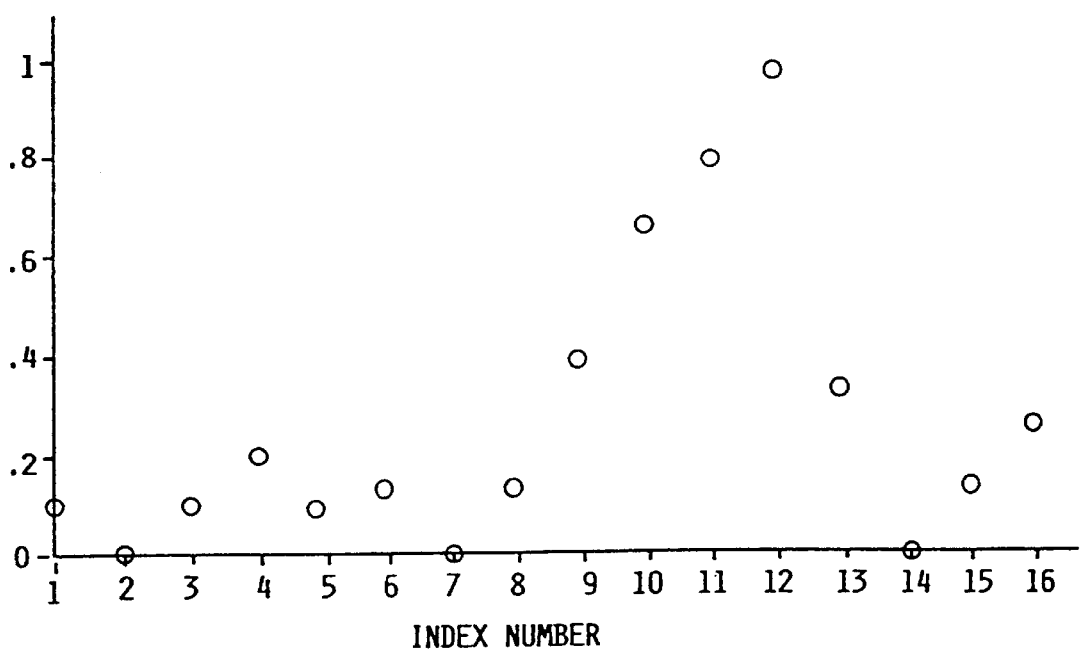

An abnormally high HRF signal may or may not indicate a surface asperity. Typically, however, a surface asperity shows a particular pattern. The transducer head rides closer to the disk surface at its trailing edge than its leading edge. If the leading edge encounters a surface asperity; i.e., an outcropping of the surface or particulate settled on the surface, the head will begin to rise from the surface at a more or less constant rate as the asperity passes under the head from its leading edge to its trailing edge. When the asperity passes beyond the trailing edge, the head drops quickly back to the disk surface, and may bounce on the surface as a result of the rapid rate of drop. FIGS. 5A and 5B illustrate two examples of HRF signal data caused by surface asperities; this data was used to train the network of FIG. 4. As can be seen in FIG. 5A, samples 2 through 7 show a typical rise in HRF signal associated with a disk asperity. This can also be seen in samples 7 through 12 of FIG. 5B.

Figure 6A:
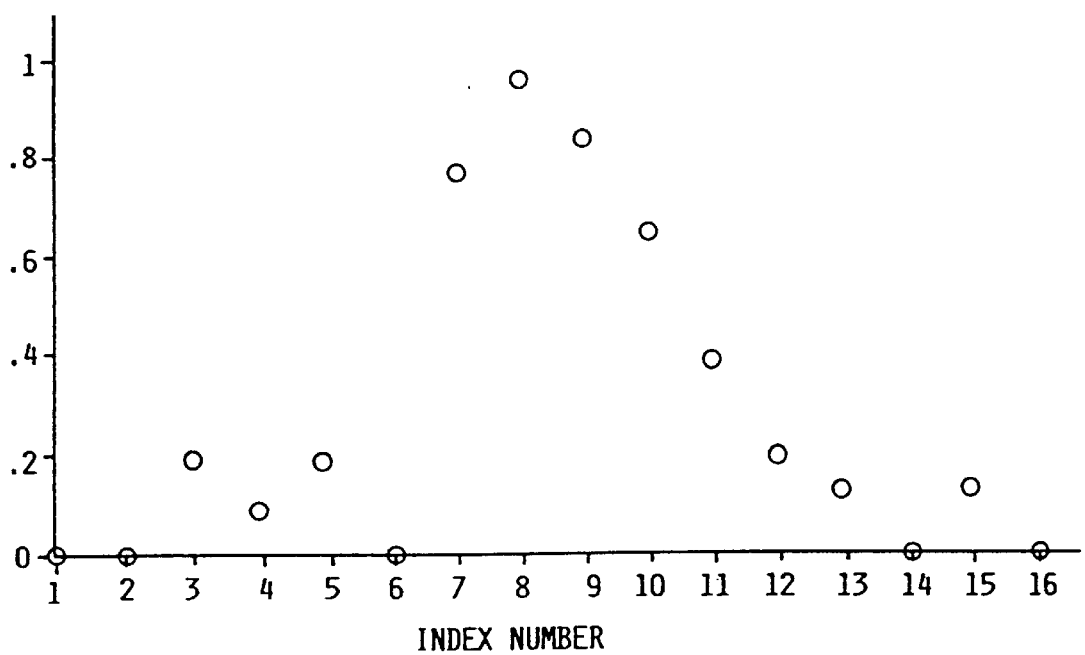
FIGS. 6A and 6B show two examples of HRF signal data caused by other disk irregularities and used to train the neural network of the preferred embodiment.
Figure 6B:
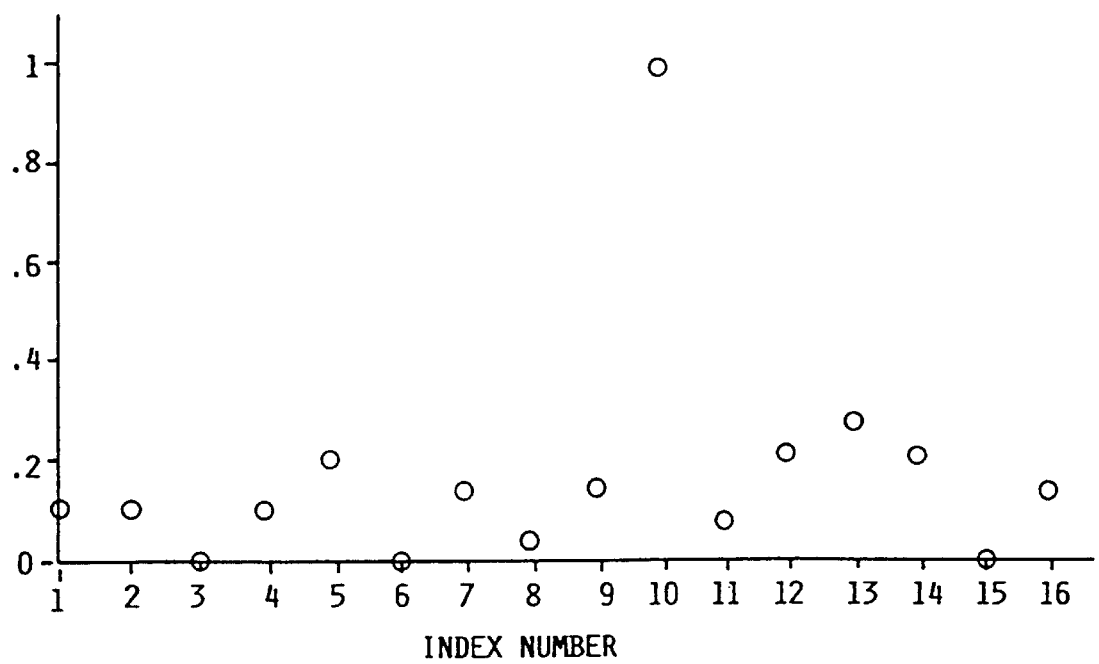

FIGS. 6A and 6B show two examples of HRF signal data caused by disk irregularities other than surface asperities. Typically, this means defects in the magnetic recording layer which reduce the strength of the read signal. In both examples of FIGS. 6A and 6B, the peak HRF value is high enough to exceed the threshold for detection of irregularities, and may in fact be higher than the HRF value for typical mechanical surface asperities. However, the pattern of the HRF value is distinctly different from that of a typical surface asperity. In FIG. 6A, the HRF value begins to rise at sample 4, then drops after sample 6, then precipitously rises again at samples 7 and 8, followed by a gradual decline from samples 8 through 14. In FIG. 6B, there is no discernible pattern but a single very high reading at sample 10.

When completely trained, a weighting factor is associated with each connection of the neural network shown in FIG. 4. FIG. 7 is a table of connection weighting factors for a fully trained neural network of the preferred embodiment. In the table of FIG. 7, the source nodes are shown in rows, while the target nodes are in columns. For example, the connection that runs from input node 12 (source) to hidden node 4 (target) has a value of –0.962610. It should be understood that actual weighting factors are highly dependent on various electrical and mechanical characteristics of the head/disk assembly, and that the set of weighting factors used for each model of disk drive will be unique. The weighting factors of FIG. 7 are illustrative of a particular disk drive model, and would not necessarily produce accurate results with other disk drive models. A unique set of training data must be obtained for other disk drive models to build an appropriate set of neural network weighting coefficients.

Figure 8:
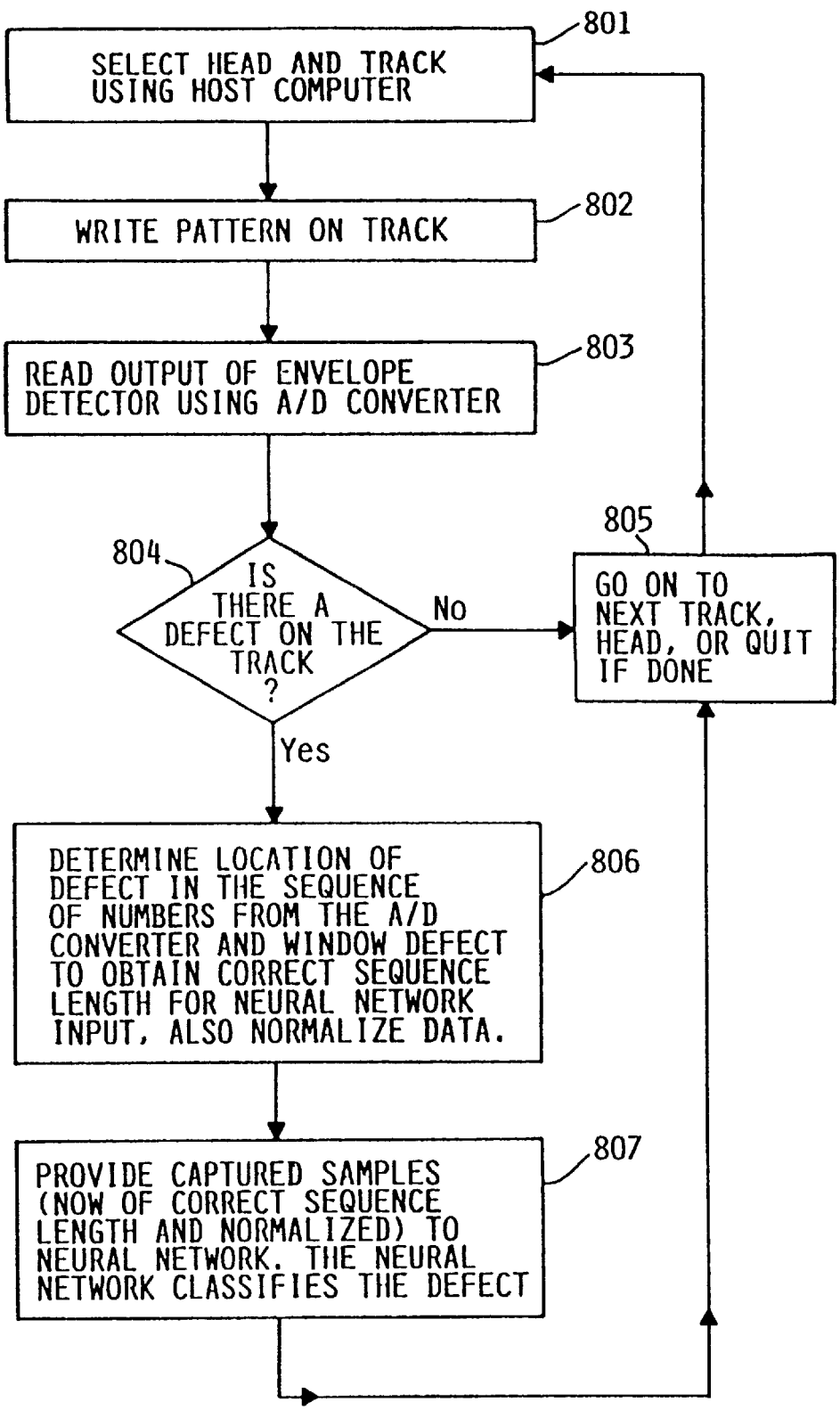
FIG. 8 is a flow chart of the major steps performed by the monitor program when testing a head/disk assembly, according to the preferred embodiment.

The operation of the present invention in accordance with the preferred embodiment will now be described. In this embodiment, a completed head/disk assembly is tested to verify disk surface uniformity after the protective enclosure is installed, but before installation of the drive electronics card. Gold card 210 as described above and shown in FIG. 2 is coupled to the head/disk assembly. The test performed for surface uniformity is known as a "glide" test. The major steps of the glide test are depicted in FIG. 8.

After physically installing the head/disk assembly in the test environment and connecting the electrical couplings, monitor program 326 executing on CPU 301 commands gold card 210 to select a head and track for writing at step 801. Gold card control electronics 211 position the actuator over the selected track in response to this command. Control electronics 211 then activate write gate control line 216, which gates a square wave signal from external write line 217 to be written to the write head, at step 802.

The frequency of the write data pattern is a significant factor in obtaining optimum test results. When the test pattern is later read back and analyzed, it is not the data that is of interest (for that is just a known alternating pattern), but the amplitude of the read back signal. Ideally, the frequency should near the maximum transition frequency of the transducer head. A significantly higher frequency would mean that the head never generates maximum amplitude, while a significantly lower frequency would give fewer peaks in the read back signal and make amplitude modulation less accurate. It would be possible to write an alternating data pattern of ones and zeroes with the normal data writing electronics, but the frequency of such a pattern would be limited to integral fractions of a fundamental frequency dictated by the processor clock speed, In order to obtain an optimum frequency for the write pattern, square wave generator 205 is used. The optimum frequency will vary depending on the construction of the head/disk assembly, but for industry standard 3.5" drives currently in use, the optimum frequency is normally in the neighborhood of 5 MHz.

After writing the square wave pattern on a complete data track at step 802, monitor program 320 commands gold card 210 to read the data track. Transducer signals from the appropriate transducer head are read by transducer electronics 215 at step 803. The data itself is ignored, it being the known data pattern. A tap of the read signal is fed into differential amplifier 220, HRF signal generator 221, and high-pass filter 222 to produce the analog HRF signal on line 203 as the track is read. The analog HRF signal is sampled at a sample rate of approximately 150 KHz, and digitized by sampler card 308. The digitized samples are stored in buffer 323 of monitor 201.

Monitor program 320 then examines the digitized samples in buffer 323 to determine whether any sample exceeds a predetermined threshold, which may indicate a defect, at step 804. If no samples in excess of the threshold are found, the track passes the glide test. Monitor program 320 then goes on to the next head or track to be tested at step 805, and steps 801–804 are repeated for the next head or track. Each head (one for each surface) is tested separately. While it would be possible to test every track on the disk surface in this manner, in fact monitor program tests every 20th track on each surface. It is not strictly necessary to test every track, because the head itself spans several tracks, so that if an asperity is present on any location on the surface, testing every 20th track is sufficient to cause a collision with the head.

If a sample is found to exceed the threshold at step 804, the samples must be further analyzed to determine the character of the irregularity which caused the abnormally high reading.

A "window" of consecutive samples taken in the vicinity of the abnormally high reading is selected for analysis by the neural network at step 806. A total of 16 samples is selected, this number corresponding to the number of input nodes in the neural network. While the neural network could have been constructed with a larger or smaller number of input nodes, the number 16 appears to be sufficiently large at the chosen sampling rate to encompass the entire envelope of the irregularity, without being unnecessarily large. In the preferred embodiment, the beginning of the window is identified by backing up from the sample showing the abnormally high reading until the samples drop below a quiescent value threshold, and starting with the sample before this point. However, there are any number of acceptable alternative means of identifying the window. For example, the window could be selected by beginning with the 9th sample before the first abnormally high reading and continuing for 15 more consecutive samples. As long as the entire envelope of irregularity is included within the window, the neural network should be able to produce a satisfactory analysis.

Prior to input to the neural network for analysis, the samples are normalized between 1 and 0, so that the highest sample reading in the window is 1. The pre-normalization makes the neural network more efficient.

Monitor program 320 then calls neural network utility program 321 to analyze the window of 16 samples at step 807. Utility 321 executing on CPU 301 uses the neural network topology and weighting coefficients stored in data structures 322 to emulate the neural network shown in FIG. 4. The 16 normalized samples of the pre-selected window are input to the neural network at input nodes 401–416 and an output is produced at output nodes 431–432. This output is in the form of a real number between 0 and 1, indicating a certainty of the result. One of the output nodes represents a mechanical surface asperity. An output close to 1 at this node indicates that the sample data is characteristic of a mechanical surface asperity, while an output close to 0 indicates that the sample data does not conform to the typical pattern of a surface asperity. Conversely, an output close to 1 at the other node indicates that the sample data is a defect other than a surface asperity; e.g., a magnetic defect.

Test monitor logs the resultant output of the neural network and continues to test the next head or track at step 805. Ideally, the neural network produces a result to a reasonable certainty; i.e., one of the outputs is close to 1 while the other is close to 0. In this case, monitor program 320 logs the irregularity as either mechanical surface asperity or magnetic defect, as indicated by the neural network output. In the rare case where the neural network is unable to classify the irregularity with sufficient certainty; i.e., both outputs are about the same, the disk is manually examined to determine the cause of the irregularity. In this case, the results of the manual examination can be used as additional training data to refine the neural network so that in the future it is able to classify the irregularity correctly.

If a head/disk assembly exhibits no mechanical surface asperities during glide test of the various tracks and heads, it passes the glide test and assembly proceeds to the next level, which is typically connection of the drive electronics card to the head/disk assembly. If any surface asperity is detected on any track, the head/disk assembly is rejected. Depending on the number of defects found and other factors, the assembly may be scrapped or reworked. Typically, an assembly which exhibits no surface asperities, but does have some magnetic defects, is acceptable for shipment to the customer. In this case, the drive electronics is capable of remapping defective sectors to avoid the problem, as is known in the art. However, if the number of magnetic defects is sufficiently large, the head/disk assembly may be rejected on this ground as well.

Although in the preferred embodiment, test monitor 201 is an IBM PS/2 computer system, which is a general purpose computer, and the neural network is actually an artificial neural network which is simulated on the general purpose computer system by a neural network utility, it should be understood that the monitoring functions of the present invention could be performed by special purpose computers and/or by more than one computer system. For example, a general purpose computer system could perform the functions of monitoring program 320, while special purpose neural network hardware performs the function of neural network utility 321 and data structures 322.

In the preferred embodiment described above, the present invention is used only in testing disk drives as part of the manufacturing process, and before shipment to a customer. In an alternative embodiment, it would be possible to include all hardware and software required for practicing the present invention on the disk drive circuit card that is shipped with the disk drive to each customer. In this alternative embodiment, the circuit card would include a differential amplifier, amplitude modulator and analog-to-digital converter performing a similar function to elements 220 and 221 of the gold card and 310, 311 of the test monitor. Since the circuit card normally contains a processor and a memory, it may be possible to program the processor of the circuit card to perform the functions of monitor program 320 and neural network utility 321 and data structures 322. A neural network chip could also be used. In this alternative embodiment, a control program resident in the memory of the circuit card would periodically, or on command from a host, run an asperity test of the disk surface as described above. Data on the tracks to be used for testing would first be saved to an unused part of the disk or to other data storage on the host. A square wave pattern approximating a desired frequency could be generated by the processor on the circuit card switching an input to the transducer head at intervals which are an integral multiple of some number of clock cycles for the processor. If the control-program of this alternative embodiment detects an unacceptable surface irregularity which may cause the transducer head to fail, several possible actions may be taken. The control program in the drive may issue a warning to the host system of possible impending disk failure, permitting the user to replace the disk at a convenient service interval and/or before data is irretrievably lost. The control program may also mark those tracks in the vicinity of the asperity as unusable, thus reducing or eliminating the rate of collisions with the asperity and extending transducer life.

In the preferred embodiment described above, the neural network is used only for characterizing an HRF signal as either a surface asperity or a defect which is not a surface asperity. Because a surface asperity is most likely to affect disk reliability in the field, the need to categorize other types of irregularities is reduced. However, in an alternative embodiment, the neural network could be used to identify and classify other types of irregularities.

In the preferred embodiment, an HRF signal as described above is used as a source of data for characterizing a defect. The HRF signal has the advantage of being directly proportional to the flyheight. However, it would alternatively be possible to use samples derived from other signals as the source of input data for the neural network. For example, a simple amplitude modulation of the read back signal will yield a signal which varies inversely with the flyheight d, although the relationship is not one of direct proportion. It would be possible to derive other variations of the read back signal or other signals from the drive, alone or in combination with an HRF signal, to be used as input to the neural network to classify irregularities.

In the preferred embodiment, an artificial neural network is used for characterizing the HRF signal. The neural network has the advantage of being easily trained and adaptable to changes in design of the disk. However, it would be possible in an alternative embodiment to use other forms of automated analysis of the signals derived from testing. For example, a rule-based expert system could analyze the HRF samples to classify detected irregularities.

Although a specific embodiment of the invention has been disclosed along with certain alternatives, it will be recognized by those skilled in the art that additional variations in form and detail may be made within the scope of the following claims.

What is claimed is:

1. A method for detecting defects in a disk drive storage device, said disk drive storage device comprising at least one disk, said method comprising the steps of:

deriving a test signal from said disk drive by writing a square wave data pattern having a selected frequency on the surface of a disk of said disk drive; and reading said square wave data pattern to produce said test signal, said test signal being indicative of a disk surface parameter to be measured, said test signal varying as a function of at least one input parameter over a range of values of said at least one input parameter;

identifying a sample of said test signal exceeding a predetermined threshold value to detect an abnormal value of said test signal indicative of a parameter to be measured;

identifying a window of a plurality of samples of said signal relative to said detected abnormal value in response to detecting said abnormal value;

providing a neural network for receiving said identified window of said plurality of samples including at least one neural network data structure defining data path adaptive weights for said disk drive storage device; and analyzing said identified window of said plurality of samples with said neural network to determine whether a predefined defect exists in said disk drive storage device.

2. The method for detecting defects in a disk drive storage device of claim 1, wherein said step of reading said square wave data pattern to produce said test signal comprises deriving a harmonic ratio flyheight signal from reading said square wave data pattern.

3. The method for detecting defects in a disk drive storage device of claim 1, wherein said step of writing a square wave data pattern on the surface of a disk of said disk drive includes the step of writing said square wave pattern having a frequency near a maximum transition frequency of a transducer head of said disk drive.

4. The method for detecting defects in a disk drive storage device of claim 1, wherein said step of writing a square wave data pattern on the surface of a disk of said disk drive includes the step of selecting predefined tracks on said disk surface and writing to said selected tracks.

5. A method for detecting defects in a disk drive data storage device, said disk drive data storage device having at least one disk surface for storing data, at least one transducer head for reading data stored on said disk surface, and an actuator for positioning said transducer head to read said data, said transducer head producing a data read signal indicative of data stored on said disk surface when positioned near said data by said actuator, said method comprising the steps of:

generating a parameter signal indicative of a parameter to be measured with respect to said disk drive from said data read signal produced by said transducer head by writing a square wave data pattern having a frequency selectively provided near a maximum transition frequency of said at least one transducer head on the surface of a disk of said disk drive; and reading said square wave data pattern to produce said data read signal;

identifying a sample of said parameter signal exceeding a predetermined threshold value to detect an abnormal value of said parameter signal;

deriving a window of a plurality of consecutive samples of said parameter signal in response to detecting said abnormal value; said window of said plurality of consecutive samples of said parameter signal including a selected number of samples both before and after said detected abnormal value;

providing an automated neural network analyzer for receiving said identified window of said plurality of consecutive samples including at least one neural network data structure defining data path adaptive weights for said disk drive data storage device; and analyzing a pattern defined by said plurality of consecutive samples with said automated neural network analyzer to determine a type of defect indicated by said plurality of samples.

6. The method for detecting defects in a disk drive data storage device of claim 5, wherein said step of generating a parameter signal comprises generating a harmonic ratio flyheight signal.

7. A method for detecting defects in a disk drive storage device, said disk drive storage device comprising at least one disk, said method comprising the steps of:

deriving a test signal from said disk drive, said test signal being indicative of a disk surface parameter to be measured, said test signal varying as a function of at least one input parameter over a range of values of said at least one input parameter;

identifying a sample of said test signal exceeding a predetermined threshold value to detect an abnormal value of said test signal indicative of a parameter to be measured;

identifying a window of a plurality of samples of said signal relative to said detected abnormal value in response to detecting said abnormal value;

providing a neural network for receiving said identified window of said plurality of samples including at least one neural network data structure defining data path adaptive weights for said disk drive storage device; said step of identifying said window of said plurality of samples including the step of normalizing said plurality of samples, whereby said neural network is more efficient; and analyzing said identified window of said plurality of samples with said neural network to determine whether a predefined defect exists in said disk drive storage device.

\* \* \* \* \*